US008818762B2

(12) United States Patent
Hill et al.

(10) Patent No.: US 8,818,762 B2
(45) Date of Patent: Aug. 26, 2014

(54) METHOD AND APPARATUS FOR THE SPATIALLY RESOLVED MEASUREMENT OF A PHYSICAL VARIABLE

(75) Inventors: Wieland Hill, Odenthal (DE); Martin Fromme, Köln (DE); Jochen Kübler, Köln (DE); Ingo Roda, Köln (DE)

(73) Assignee: Lios Technology GmbH, Cologne (DE)

( * ) Notice: Subject to any disclaimer, the term of this patent is extended or adjusted under 35 U.S.C. 154(b) by 683 days.

(21) Appl. No.: 13/163,066

(22) Filed: Jun. 17, 2011

(65) Prior Publication Data
US 2011/0313732 A1 Dec. 22, 2011

(30) Foreign Application Priority Data
Jun. 17, 2010 (DE) .......................... 10 2010 024 178

(51) Int. Cl.
*H03F 1/26* (2006.01)
(52) U.S. Cl.
USPC .......................................................... 702/189
(58) Field of Classification Search
USPC .......................................................... 702/189
See application file for complete search history.

(56) References Cited

U.S. PATENT DOCUMENTS 7,126,586 B2 * 10/2006 Jianping et al. ............... 345/166
7,355,163 B2 4/2008 Watley et al.
7,742,892 B2 * 6/2010 Fromme et al. ............... 702/104
2009/0103072 A1 4/2009 Fromme
2009/0240455 A1 9/2009 Fromme et al.

FOREIGN PATENT DOCUMENTS

| DE | 195 25 626 A1 | 4/1996 |
| DE | 10 2006 015 159 A1 | 10/2007 |
| EP | 2 017 593 A2 | 1/2009 |
| WO | 2006027369 A1 | 3/2006 |

OTHER PUBLICATIONS

"System Description FibroLaser II", Siemens, Cerberus Division W 458e, Version 1.2e, Jan. 1999.

* cited by examiner

*Primary Examiner* — Aditya Bhat
(74) *Attorney, Agent, or Firm* — Laurence A. Greenberg; Werner H. Stemer; Ralph E. Locher

(57) ABSTRACT

A device for spatially resolved measuring of a physical variable has a device for generating a first electrical signal with a first frequency and a device for generating a second electrical signal with a second frequency. The second frequency differs from the first frequency by a difference frequency. An optical radiation source generates an optical signal modulated by the first frequency. The optical signal can interact with a test object and be modified in the process. A mixer can mix an electrical signal emerging from the optical signal with the second signal. A device, particularly embodied as a DDS system, generates a third electrical signal with a third frequency that corresponds to the difference frequency or a multiple of the difference frequency. A digital/analog converter digitizes the at least one mixed signal by sampling the mixed signal at the third frequency in order to digitize it.

17 Claims, 4 Drawing Sheets

METHOD AND APPARATUS FOR THE SPATIALLY RESOLVED MEASUREMENT OF A PHYSICAL VARIABLE

CROSS-REFERENCE TO RELATED APPLICATION

This application claims the priority, under 35 U.S.C. §119, of German patent application DE 10 2010 024 178.4, filed Jun. 17, 2010; the prior application is herewith incorporated by reference in its entirety.

BACKGROUND OF THE INVENTION

Field of the Invention

The present invention relates to a method for a spatially resolved measurement of a physical variable and to a device for the spatially resolved measurement of the physical variable.

A generic method for spatially resolved measuring of a physical variable may be summarized as follows:

a first electrical signal with first time-varying frequency is generated, a second electrical signal with a second time-varying frequency is generated, which differs from the first frequency by a difference frequency, and an optical signal is generated and modulated by the first frequency;

the optical signal is modified by an interaction with a test object, wherein the modification contains information relating the physical variable to be measured in a spatially resolved fashion, the modified optical signal is converted into at least one electrical signal, wherein either the modified optical signal is modulated by the second frequency before the conversion, or the modified optical signal is mixed with a signal modulated by the second frequency before the conversion, or the at least one electrical signal is mixed with the second signal, to form a mixed signal;

the mixed signal is digitized, and the physical variable to be measured is determined in a spatially resolved fashion from the digitized data.

A corresponding device for spatially resolved measuring of a physical variable, that is suitable for carrying out the method, includes the following:

means for generating a first electrical signal with a first time-varying frequency, means for generating a second electrical signal with a second, time-varying frequency, which differs from the first frequency by a difference frequency, an optical radiation source, more particularly a laser, for generating an optical signal, that can be actuated, or the output signal thereof can be modulated, such that an optical signal modulated by the first frequency can be generated, means for allowing an interaction between the optical signal and a test object, wherein the optical signal can be modified by the interaction with information relating to the physical variable to be measured in a spatially resolved fashion, transducer means, which can convert the modified optical signal into at least one electrical signal; and mixing and/or modulating means, which either are able to modulate the modified optical signal with the second frequency before the conversion, or are able to mix the modified optical signal with a signal modulated by the second frequency before the conversion, or are able to mix the at least one electrical signal emerging from the conversion with the second signal. The device further includes a D/A converter for digitizing the at least one mixed signal and evaluation means for determining the physical variable to be measured in a spatially resolved fashion from the digitized data.

DEFINITIONS

Optical frequency domain reflectometry (OFDR) is referred to as an OFDR method in the following text. Devices or integrated circuits or systems that are suitable for carrying out a direct digital synthesis (DDS) are referred to as "DDS systems" in the following text. If the terms light, optical radiation or optical signal are used in the following text, this means electromagnetic radiation in the optical spectral range, more particularly from XUV to FIR.

In the case of distributed temperature sensing (DTS) in fiberglass by means of an OFDR method and in the case of a number of other applications there is the object of measuring the amplitude and phase of optical or electrical signals quickly and with little noise. This is decisive for the time- and temperature resolution in distributed temperature sensing.

"System description FibroLaser II", Siemens Cerberus Division W458e, version 1.2e from January 1999 described a method and a device of the type specified at the outset. The device described therein comprises a frequency generator for generating a signal frequency and a local oscillator frequency that differs from the signal frequency by a fixed difference frequency. The optical radiation from a laser is frequency-modulated by the signal frequency and coupled into a light-conducting fiber. The components of this optical radiation that are backscattered as a result of Raman Effects are decoupled from the fiber and converted into electrical signals by photomultipliers. These are mixed with the local oscillator frequency and subjected to analog filtering. They are subsequently digitized and Fourier transformed into the spatial domain. The backscatter profiles of the signals obtained thus on account of the Raman Effect form the basis for calculating the temperature.

Such a measuring system constitutes a so-called heterodyne receiver, in which a signal frequency is mixed with a local oscillator frequency in order to obtain a fixed difference frequency. The latter can be filtered and amplified in a narrow bandwidth. However, in the case of analog systems, this filtering is limited as a result of component tolerances and drift. Moreover, narrowband filters require relatively long settling times, during which the amplitudes and phases are influenced by the filter.

SUMMARY OF THE INVENTION

It is accordingly an object of the invention to provide a method and a device for measuring a physical variable with spatial resolution which overcome the above-mentioned disadvantages of the heretofore-known devices and methods of this general type and which allow for a faster and/or less noisy measurement of the physical variable.

With the foregoing and other objects in view there is provided, in accordance with the invention, a method for spatially resolved measurement of a physical variable, the method which comprises the following method steps:

generating a first electrical signal with first time-varying frequency;

generating a second electrical signal with a second time-varying frequency, which differs from the first frequency by a difference frequency;

generating a third electrical signal with a third frequency, the third frequency corresponding to the difference frequency or a multiple of the difference frequency;

generating an optical signal and modulating the optical signal by the first frequency;

modifying the optical signal by an interaction with a test object to generate a modified optical signal, with a modification containing information relating the physical variable to be measured;

converting the modified optical signal into at least one electrical signal, and thereby either:

modulating the modified optical signal by the second frequency prior to converting; or mixing the modified optical signal with a signal modulated by the second frequency prior to converting; or mixing the at least one electrical signal with the second signal;

digitizing the resulting mixed signal by sampling the mixed signal at the third frequency to form digitized data; and determining the physical variable in a spatially resolved fashion from the digitized data.

With the above and other objects in view there is also provided, in accordance with the invention, an apparatus for measuring a physical variable with spatial resolution, comprising:

a first device for generating a first electrical signal with a first time-varying frequency;

a second device for generating a second electrical signal with a second, time-varying frequency differing from the first frequency by a difference frequency;

a third device for generating a third electrical signal with a third frequency corresponding to the difference frequency or a multiple of the difference frequency;

an optical radiation source for generating an optical signal, the optical radiation source being configured to be driven, or to have an output signal thereof modulated, such that an optical signal modulated by the first frequency can be generated;

a device enabling an interaction between the optical signal and a test object, wherein the optical signal is modified by the interaction with information relating to the physical variable to be measured;

a transducer for converting the modified optical signal into at least one electrical signal;

a mixer and/or modulator device configured to either:

modulate the modified optical signal with the second frequency before a conversion thereof; or mix the modified optical signal with a signal modulated by the second frequency before the conversion thereof; or mix the at least one electrical signal emerging from the conversion with the second signal;

a D/A converter for digitizing the at least one mixed signal by sampling the at least one mixed signal at the third frequency; and an evaluation device connected to the D/A converter for determining the physical variable to be measured in a spatially resolved fashion from the digitized data.

The apparatus is particularly suitable for carrying out the above-summarized method according to the invention.

In other words, according to the invention, provision is made of generating a third electrical signal with a third frequency, wherein the third frequency corresponds to the difference frequency or a multiple of the difference frequency, and of sampling the mixed signal at the third frequency for the purposes of digitizing. Also in accordance with the invention, the novel device comprises means for generating a third electrical signal with a third frequency, wherein the third frequency corresponds to the difference frequency or a multiple of the difference frequency, and wherein the D/A converter can sample the at least one mixed signal at the third frequency in order to digitize it. This allows use of a digital filter instead of an analog filter, and so better noise suppression and/or faster measuring of amplitude and phase of the optical signals is made possible.

Provision can be made for the first and/or the second and/or the third electrical signal to be generated by means of direct digital synthesis. Accordingly, provision can be made for the means for generating the first electrical signal to be a first DDS system and/or for the means for generating the second electrical signal to be a second DDS system and/or for the means for generating the third electrical signal to be a third DDS system. By using DDS systems for generating the three electrical signals there is a transition to digital technology.

Here, a clock signal can preferably be utilized for the direct digital synthesis of the first and/or the second and/or the third electrical signal, wherein more particularly the same clock signal is utilized for the direct digital synthesis of the first and the second and the third electrical signal. Accordingly, provision can be made for the device to comprise furthermore a clock generator, which can apply a clock signal to the first DDS system and/or the second DDS system and/or the third DDS system. Within the scope of the DDS resolution of e.g. 0.12 Hz, coupling all three DDS systems to the same clock signal leads to a precise digital sampling of the signal to be digitized. In the process, frequency calculation on the basis of digital words is advantageous such that no rounding errors occur as a result of conversion to real numbers. A drift in the clock signal has the same effect on all three DDS systems, and so the precise sampling frequency is always achieved.

This concept of frequency generation and sampling allows the use of a new, digital filtering technique.

The digital filter does not require any settling time. Narrowband analog filters can be dispensed with in the design. The precise sampling allows the implementation of higher difference frequencies with narrower bandwidth detection than with analog technology.

Other features which are considered as characteristic for the invention are set forth in the appended claims.

Although the invention is illustrated and described herein as embodied in a method and device for spatially resolved measuring of a physical variable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
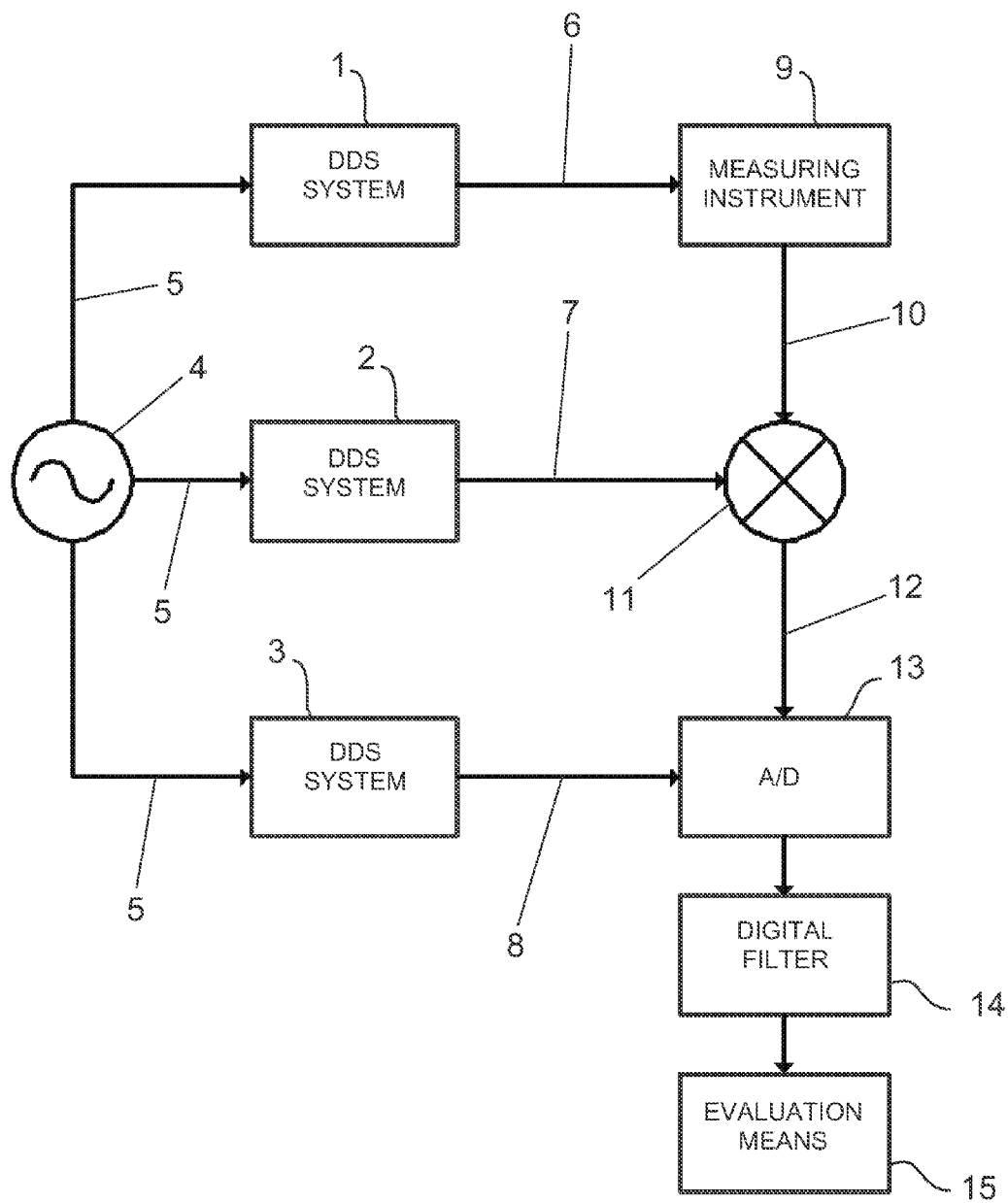
FIG. 1 shows a schematic view of a first embodiment of a device according to the invention.

Referring now to the figures of the drawing in detail and first, particularly, to FIG. 1 thereof, there is shown a first exemplary embodiment that comprises a first DDS system 1, a second DDS system 2, and a third DDS system 3 as a means for generating electrical signals. The device furthermore comprises a clock generator 4, which emits a clock signal (CLK) 5. The three DDS systems 1, 2, 3 each utilize the same clock signal 5.

The first DDS system 1 generates a first time-varying electrical signal 6, which has a first time-varying frequency $f_{RF}(t)$. The second DDS system 2 generates a second time-varying electrical signal 7, which has a second time-varying frequency $F_{LO}(t)$. The second frequency $f_{LO}(t)$ differs from the first frequency $f_{RF}(t)$ by a fixed difference frequency $f_{ZF}$, which does not vary in time.

The third DDS system 3 generates a third time-varying electrical signal 8, which has a third time-varying frequency that corresponds to the product of the difference frequency $f_{ZF}$ and a factor of $2^N$. Here, N can equal 0, 1, 2, .... By way of example, 2, 3, 4 or 5 are preferred values for N, and so the third frequency corresponds exactly to four times, eight times, sixteen times or thirty-two times the difference frequency $f_{ZF}$.

Here, the three frequencies $f_{RF}(t)$, $t_{LO}(t)$, and $f_{ZF}$ are advantageously calculated on the basis of digital words such that there are no rounding errors as a result of conversion to real numbers. A drift in the clock signal 5 has the same effect on all three DDS systems 1, 2, 3, i.e. the relative frequency changes are the same.

Reference numeral 9 denotes a merely schematically illustrated part of a measuring instrument, which comprises a test object such as a light-conducting fiber and a photodetector in addition to an optical radiation source for generating an optical signal. The optical signal is amplitude-modulated or frequency-modulated by the first signal 6. Here, the modulation can for example be achieved by a corresponding actuation of the optical radiation source, which may for example be embodied as a laser. Alternatively, the optical signal emerging from the optical radiation source can also be modulated by an optical modulator.

The modulated optical signal can be coupled into the test object and decoupled from said test object after interaction therewith. Corresponding means for making the interaction possible can for example include coupling-in elements, decoupling elements, beam splitters, and filters. Following this, the optical signal, which was modified as a result of the interaction, can be converted into at least one electrical signal 10 in the photodetector. The conversion means used for this purpose can for example be embodied as a photomultiplier, a photodiode or another type of sensor means.

The electrical signal 10 emerging from the measuring instrument 9 is mixed with the second signal 7 in a mixer 11. Here, the mixed signal 12 precisely has the difference frequency $f_{ZF}$, with the measurement information caused by the interaction with the test object being contained in the amplitude and phase of the mixed signal 12.

The mixed signal 12 is digitized in an A/D converter 13. In the process, the mixed signal 12 is sampled at the third frequency of the third electrical signal 8. The precise sampling frequency is always achieved as a result of the same clock signal 5 being applied to each of the three DDS systems 1, 2, 3.

The digitized signal can be filtered using a digital filter 14. The filtered data can be evaluated in the subsequent evaluation means 15, and so the spatially resolved measurement data of the physical variable to be registered can be determined.

Figure 2:
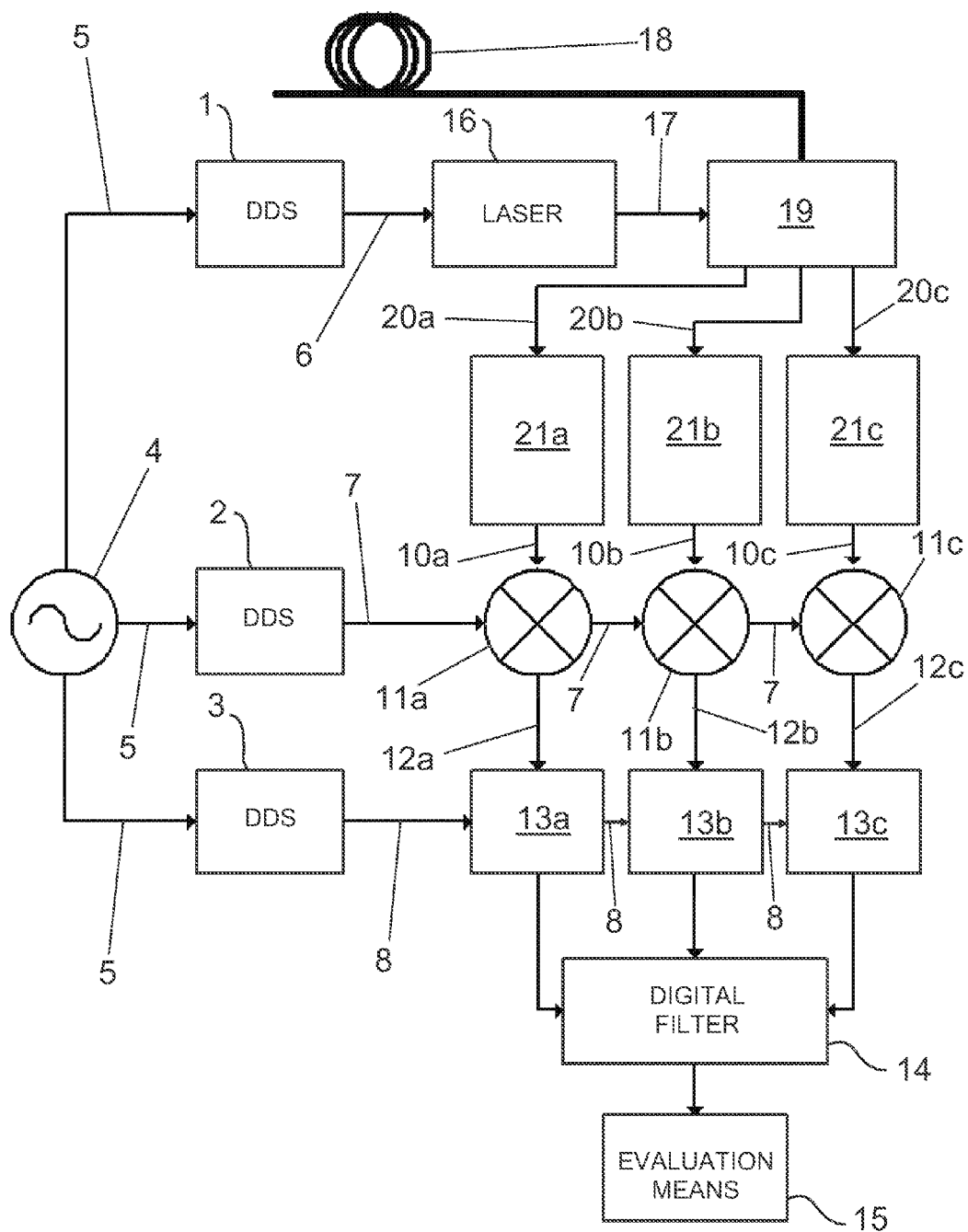
FIG. 2 shows a schematic view of a second embodiment of a device according to the invention.

In the second embodiment of a device according to the invention as per FIG. 2, distributed temperature sensing (DTS) in light-conducting fibers is explicitly carried out by means of an OFDR method.

FIG. 2 is a more detailed illustration of the measuring instrument in particular. The latter comprises a laser 16, which is frequency- or amplitude modulated by the first frequency $f_{RF}(t)$ of the first electrical signal 6. By way of example, the modulation can be achieved by a corresponding actuation of the laser 16. Alternatively, the optical signal 17 emerging from the laser 16 can also be modulated by an optical modulator.

There is by all means the option of using another type of optical radiation source, such as e.g. a super-luminescent diode, instead of the laser 16.

An optical fiber 18 serves as a test object, within which fiber the temperature in particular should be registered in a spatially resolved fashion. The reference numeral 19 denotes means for enabling the interaction with the optical fiber 18. By way of example, these means 19 can comprise coupling-in elements, decoupling elements, beam splitters, and filters.

The means 19 have three outputs for optical signals 20a, 20b, 20c. There is by all means the option of providing more than three outputs, wherein a fourth output can for example be used for the Rayleigh component of the backscattered radiation. The first optical signal 20a corresponds to the primary optical signal 17 emerging from the laser 16, and said optical signal 20a can be diverted from the latter signal 17 by a beam splitter.

The second optical signal 20b is modified in respect of the optical wavelength by a Raman interaction with the optical fiber and corresponds to the Stokes component of the backscattered radiation. The means 19 can have a corresponding filter for diverting this Stokes component.

The third optical signal 20c is likewise modified in respect of the optical wavelength by a Raman interaction with the optical fiber and corresponds to the anti-Stokes component of the backscattered radiation. In order to divert this anti-Stokes component, the means 19 can likewise have a corresponding filter.

The optical signals 20a, 20b, 20c are converted into electrical signals 10a, 10b, 10c in suitable converter means 21a, 21b, 21c. By way of example, to this end the converter means 21a, 21b, 21c may comprise photomultipliers, photodiodes, avalanche photodiodes or other suitable sensor means and possibly electrical amplifiers.

The electrical signals 10a, 10b, 10c emerging from the converter means 21a, 21b, 21c are respectively mixed with the second signal 7 in a mixer 11a, 11b, 11c. The mixed signal 12a generated by mixing has a frequency that corresponds to the difference frequency $f_{ZF}$. The signals 12b, 12c generated by mixing precisely have the difference frequency $f_{ZF}$ and contain in the signal amplitude and phase the information created by the Raman interaction with the test object.

The mixed signals 12a, 12b, 12c are respectively digitized in an A/D converter 13a, 13b, 13c. In the process, each of the mixed signals 12a, 12b, 12c is sampled at the third frequency of the third electrical signal 8. The desired sampling frequency is always precisely achieved as a result of the same clock signal 5 being applied to each of the three DDS systems 1, 2, 3.

Filtering takes place in a common downstream digital filter 14, which can correspond to the digital filter 14 from the first embodiment. The filtered data can be evaluated in evaluation means 15 adjoining said filter and, more particularly, they can be Fourier transformed such that the spatially resolved measurement data of the physical variable to be registered can be determined.

Figure 3:
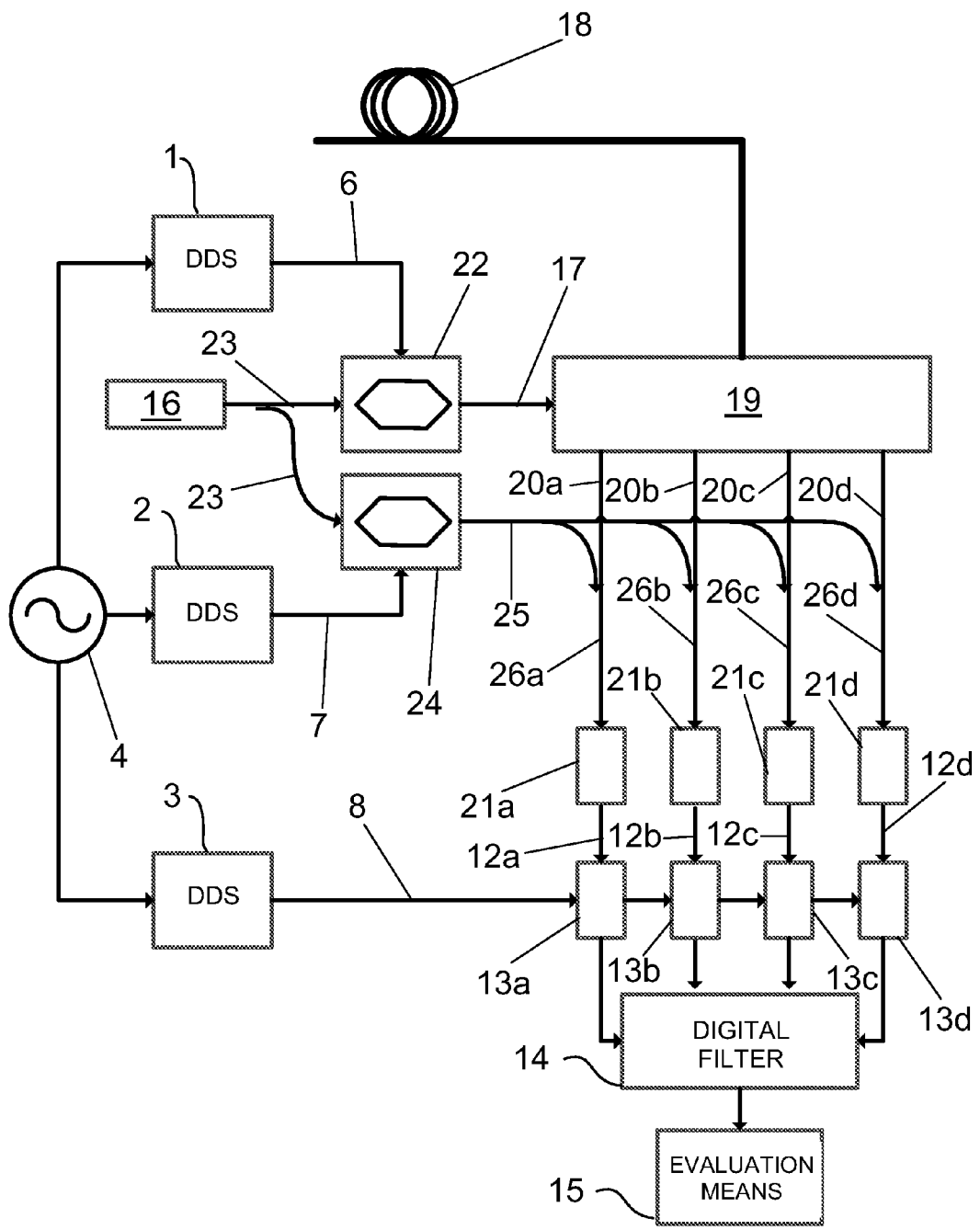
FIG. 3 shows a schematic view of a third embodiment of a device according to the invention.

The third embodiment as per FIG. 3 substantially differs from the one as per FIG. 2 in that the laser 16 is not directly modulated with the first frequency $f_{RF}(t)$ of the first electrical signal 6 but rather that use is made of a first optical modulator 22 for modulating the optical radiation 23 emerging from the laser 16. The optical signal 17 emerging from the first optical modulator 22 is coupled into the optical fiber 18 via the means 19.

In addition to the three optical signals 20a, 20b, 20c emerging from the means 19, which signals have already been described with reference to FIG. 2, a further optical signal 20d emerges from the means 19 in the third embodiment. By way of example, this further optical signal can be the backscattered Rayleigh component of the optical radiation.

There is by all means the option of only providing three emerging optical signals 20a, 20b, 20c in the third embodiment as well. Furthermore, provision can also be made in the second embodiment for a fourth emerging signal 20d to be registered as well.

Furthermore, provision is made for a second optical modulator 24, in which part of the optical radiation 23 of the laser 16 is modulated by the second frequency $f_{LO}(t)$. The optical signal 25 emerging from the second optical modulator 24 is optically mixed or coupled into the optical signals 20a, 20b, 20c, 20d.

These mixed optical signals 26a, 26b, 26c, 26d are converted into electrical signals 12a, 12b, 12c, 12d in suitable converter means 21a, 21b, 21c, 21d. Like in the second exemplary embodiment, the signal 12a has a frequency that corresponds to the difference frequency $f_{ZF}$. Furthermore, the signals 12b, 12c, 12d precisely have the difference frequency $f_{ZF}$ and contain in the signal amplitude and phase the information created by the Raman interaction with the test object.

The mixed signals 12a, 12b, 12c, 12d are, like in the second embodiment as well, respectively digitized in an ND converter 13a, 13b, 13c, 13d. In the process, each mixed signal 12a, 12b, 12c, 12d is sampled at the third frequency of the third electrical signal 8. The desired sampling frequency is always precisely achieved as a result of the same clock signal 5 being applied to each of the three DDS systems 1, 2, 3.

Figure 4:
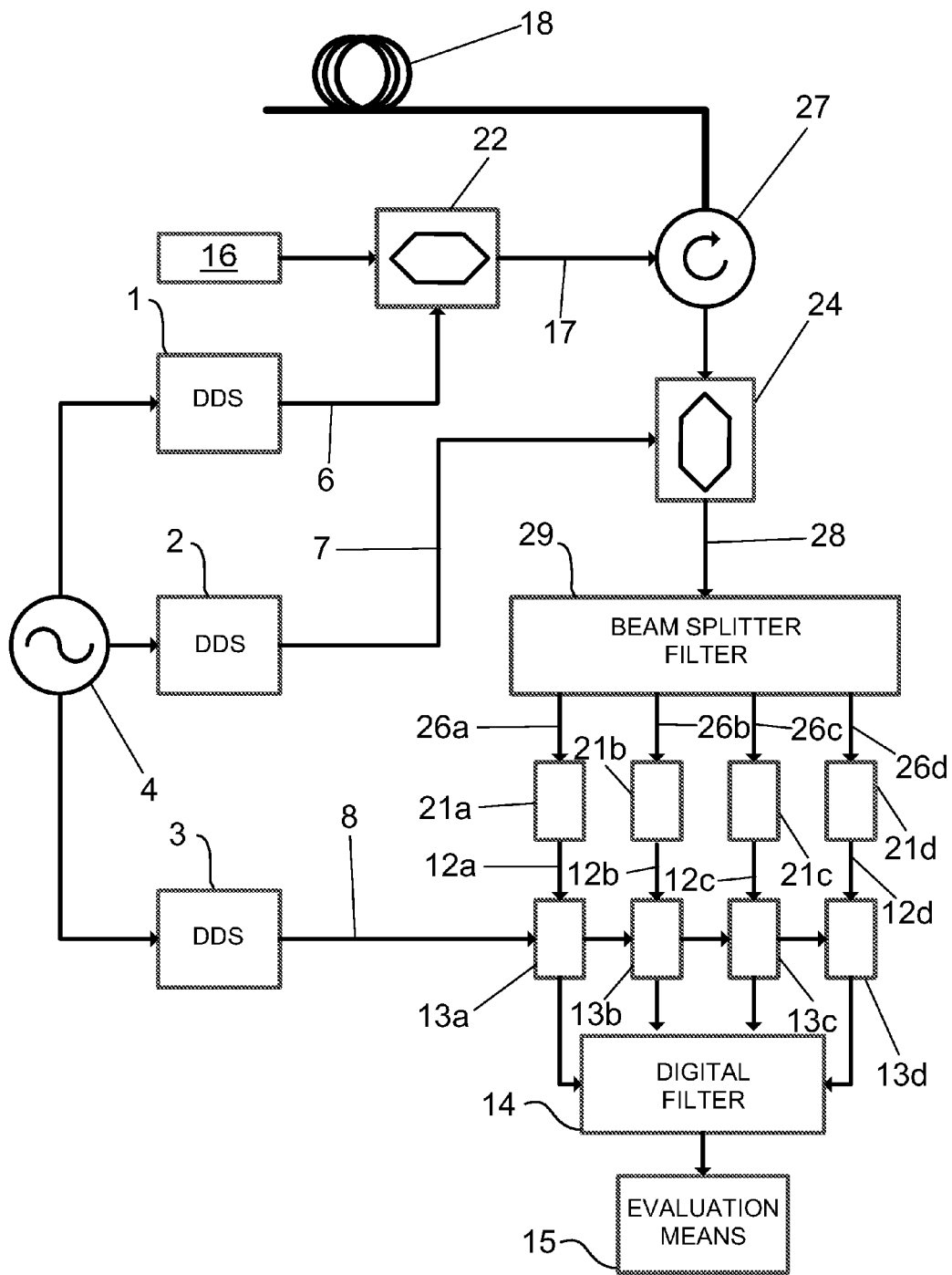
FIG. 4 shows a schematic view of a fourth embodiment of a device according to the invention.

The fourth embodiment (FIG. 4) only differs unsubstantially from the third embodiment (FIG. 3). The optical signal 17 emerging from the first optical modulator 22 is coupled into the optical fiber 18 via a circulator 27. The signal emerging from the fiber 18 reaches the second optical modulator 24 via the circulator. There is an additional modulation with the second frequency $f_{LO}(t)$ there, and so the optical signal 28 emerging from the second optical modulator 24 is modulated by the difference frequency $f_{ZF}$.

This signal 28 enters means 29 for beam splitting and filtering, in which the signal is filtered and, in the process, split into the individual channels such that the optical signals 26a, 26b, 26c, 26d emerge from the means 29. These optical signals are processed further as described in the second and third examples.

There is, of course, the option of only providing three emerging optical signals 26a, 26b, 26c in this embodiment as well. Furthermore, appropriate components, such as e.g. the circulator 27, can also be used in the second embodiment and in the third embodiment.

The invention claimed is:

1. A method for spatially resolved measurement of a physical variable, the method which comprises the following method steps:

generating a first electrical signal with first time-varying frequency;

generating a second electrical signal with a second time-varying frequency, which differs from the first frequency by a difference frequency;

generating a third electrical signal with a third frequency, the third frequency corresponding to the difference frequency or a multiple of the difference frequency;

generating an optical signal and modulating the optical signal by the first frequency;

modifying the optical signal by an interaction with a test object to generate a modified optical signal, with a modification containing information relating the physical variable to be measured;

converting the modified optical signal into at least one electrical signal, and thereby either:
  modulating the modified optical signal by the second frequency prior to converting; or
  mixing the modified optical signal with a signal modulated by the second frequency prior to converting; or
  mixing the at least one electrical signal with the second signal;

digitizing the resulting mixed signal by sampling the mixed signal at the third frequency to form digitized data; and determining the physical variable in a spatially resolved fashion from the digitized data.

2. The method according to claim 1, wherein the third frequency corresponds to a product of the difference frequency and a factor of $2^N$, wherein N=0, 1, 2, . . . .

3. The method according to claim 1, which comprises generating the first electrical signal and/or the second electrical signal and/or the third electrical signal by way of direct digital synthesis.

4. The method according to claim 3, which comprises utilizing a clock signal for the direct digital synthesis of the first electrical signal and/or the second electrical signal and/or the third electrical signal.

5. The method according to claim 3, which comprises utilizing a common clock signal for the direct digital synthesis of the first electrical signal, the second electrical signal, and the third electrical signal.

6. The method according to claim 1, wherein the third frequency is a multiple of the difference frequency.

7. The method according to claim 1 configured as a frequency domain method.

8. The method according to claim 7 configured as an OFDR method.

9. A device for measuring a physical variable with spatial resolution by carrying out the method according to claim 1.

10. An apparatus for measuring a physical variable with spatial resolution, comprising:

a first device for generating a first electrical signal with a first time-varying frequency;

a second device for generating a second electrical signal with a second, time-varying frequency differing from the first frequency by a difference frequency;

a third device for generating a third electrical signal with a third frequency corresponding to the difference frequency or a multiple of the difference frequency;

an optical radiation source for generating an optical signal, said optical radiation source being configured to be driven, or to have an output signal thereof modulated, such that an optical signal modulated by the first frequency can be generated;

a device enabling an interaction between the optical signal and a test object, wherein the optical signal is modified by the interaction with information relating to the physical variable to be measured;
a transducer for converting the modified optical signal into at least one electrical signal;
a mixer/modulator device configured to either:
  modulate the modified optical signal with the second frequency before a conversion thereof; or
  mix the modified optical signal with a signal modulated by the second frequency before the conversion thereof; or
  mix the at least one electrical signal emerging from the conversion with the second signal;
a D/A converter for digitizing the at least one mixed signal by sampling the at least one mixed signal at the third frequency; and
an evaluation device connected to said D/A converter for determining the physical variable to be measured in a spatially resolved fashion from the digitized data.

11. The device according to claim 10, wherein said optical radiation source is a laser.

12. The device according to claim 10, wherein one or more of the following are true:
  said first device for generating the first electrical signal is a first DDS system;
  said second device for generating the second electrical signal is a second DDS system; or
  said third device for generating the third electrical signal is a third DDS system.

13. The device according to claim 12, which further comprises a clock generator connected to supply a clock signal to one or more of said first DDS system, said second DDS system, and said third DDS system.

14. The device according to claim 12, which further comprises a common clock generator for supplying said first, second, and third DDS systems with a common clock signal.

15. The device according to claim 10, wherein the test object is an optical fiber.

16. The device according to claim 15, wherein said optical fiber is included in the device.

17. The device according to claim 15, wherein the physical variable to be measured in a spatially resolved fashion is a local temperature of said optical fiber.

* * * * *